(12) United States Patent
Ishiguro

(10) Patent No.: US 6,314,243 B1
(45) Date of Patent: Nov. 6, 2001

(54) ELECTRONIC FLASH LIGHT-EMISSION CONTROLLING METHOD AND APPARATUS AND CAMERA

(75) Inventor: Minoru Ishiguro, Omiya (JP)

(73) Assignee: Fuji Photo Optical Co. Ltd.

( * ) Notice: Subject to any disclaimer, the term of this patent is extended or adjusted under 35 U.S.C. 154(b) by 0 days.

(21) Appl. No.: 09/599,829

(22) Filed: Jun. 23, 2000

(30) Foreign Application Priority Data

Jun. 25, 1999 (JP) .................................................. 11-180152

(51) Int. Cl.[7] .............................. G03B 15/03; G03B 7/00; G03B 7/087
(52) U.S. Cl. ............................ 396/155; 396/168; 396/187
(58) Field of Search .............................. 396/187, 61, 164, 396/155, 165, 170, 168

(56) References Cited

U.S. PATENT DOCUMENTS

| | | | |
|---|---|---|---|
| 5,113,216 | * 5/1992 | Murata | 396/66 |
| 5,144,359 | * 9/1992 | Hayashi et al. | 396/61 |
| 5,255,047 | * 10/1993 | Ishimaru et al. | 396/61 |
| 5,687,400 | * 11/1997 | Ishiguro et al. | 396/61 |
| 5,752,093 | * 5/1998 | Ishiguro et al. | 396/61 |
| 5,765,057 | * 6/1998 | Ishiguro et al. | 396/180 |
| 6,029,015 | 2/2000 | Ishiguro . | |

* cited by examiner

*Primary Examiner*—Russell Adams
*Assistant Examiner*—Arthur A Smith

(57) ABSTRACT

In a camera with a shutter that also works as a diaphragm and adjusts an aperture of a lens and a shutter speed by controlling an opening shape, a first opening value for obtaining a target exposure is found according to a subject distance, a guide number of an electronic flash, a film speed and a control target value of an exposure of the electronic flash. Then, a range of a second opening value for an electronic flash light-emission control is found according to an exposure value determined from a photometry value and the film speed. When the photometry value is more than a predetermined value for an AE control, if the first opening value is more than a predetermined value lower than a minimum value of the range of the second opening value or more than the predetermined value higher than a maximum value of the range of the second opening value, the light-emission of the electronic flash is prohibited.

10 Claims, 9 Drawing Sheets

F I G. 5
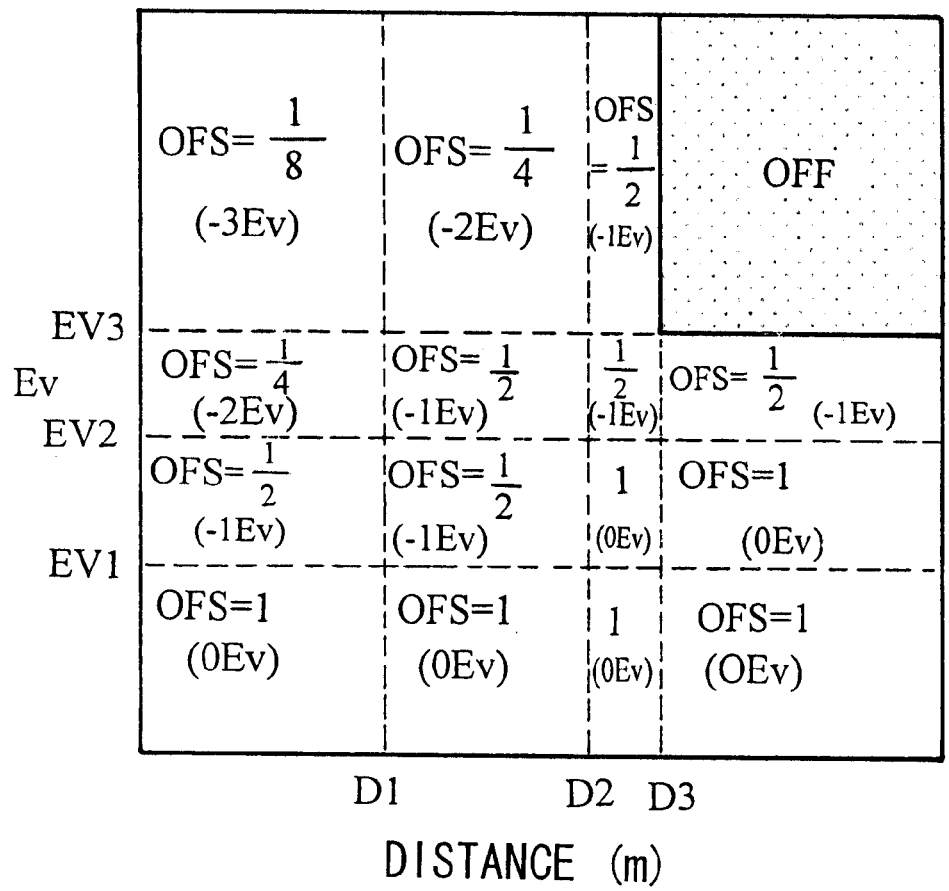

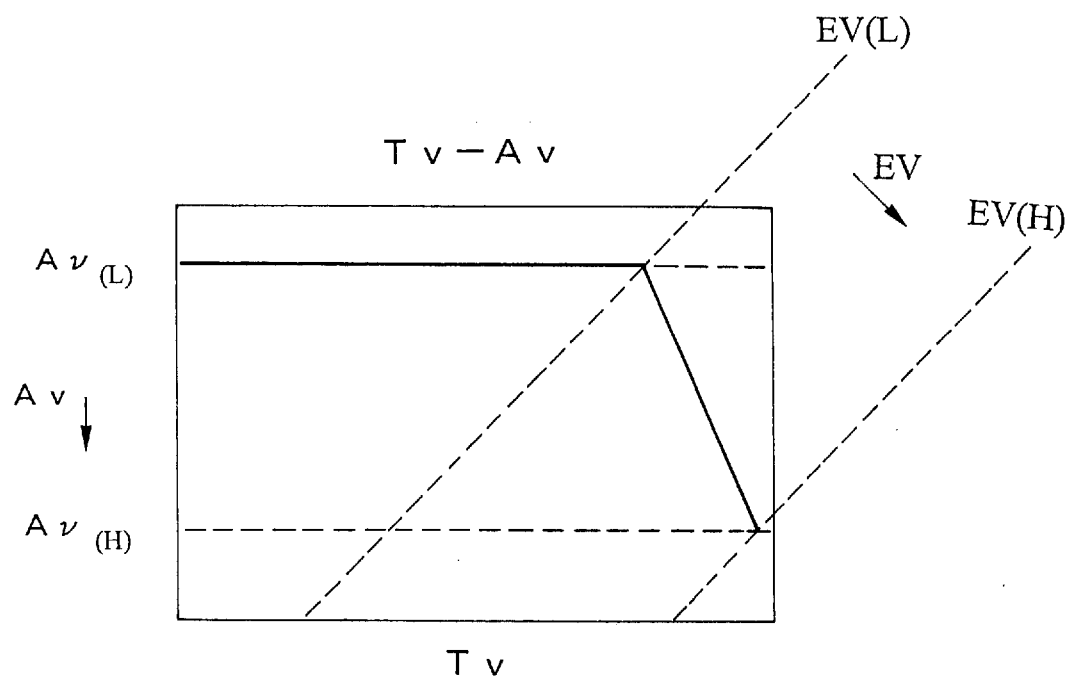
F I G. 8

ELECTRONIC FLASH LIGHT-EMISSION CONTROLLING METHOD AND APPARATUS AND CAMERA

BACKGROUND OF THE INVENTION

1. Field of the Invention

This invention relates generally to an electronic flash light-emission controlling apparatus and a camera with a built-in electronic flash. More particularly, this invention relates to technics that are applied to a camera that can perform a shooting with an appropriate exposure by utilizing the electronic flash.

2. Description of Related Art

U.S. Pat. No. 6,029,015 discloses a camera whose electronic flash is used even under conditions (external light brightness) in which an appropriate exposure can be obtained without the light of the electronic flash. U.S. Pat. No. 5,765,057 discloses a camera that prohibits an electronic flash from emitting a light when the brightness exceeds a predetermined brightness and the subject distance is longer than a predetermined distance.

In the case of a programmed shutter that adjusts an exposure by determining an aperture and a shutter speed from an opening shape of the shutter, an opening value of the shutter is determined according to an exposure value calculated from the brightness and the film speed and a range of the opening value within which the electronic flash can emit a light. In the camera disclosed in U.S. Pat. No. 5,765,057 that prohibits the electronic flash from emitting the light when the brightness exceeds the predetermined brightness and the subject distance is longer than the predetermined distance, however, the electronic flash may emit the light and may not emit the light even if an expected value of an exposure by the electronic flash is the same. Thus, the camera may waste energy. That problem occurs especially when the subject distance is long.

Even under conditions in which a shooting is possible by an AE control, for example, when the external light brightness is enough, the light of the electronic flash cancels a shade. But, if the electronic flash is used when the subject distance is short, the exposure by the electronic flash is excessive with respect to a control target value due to a restriction of an opening value of the shutter for a light-emission control of the electronic flash.

SUMMARY OF THE INVENTION

It is therefore an object of the present invention to provide an electronic flash light-emission controlling method and apparatus and a camera that can save energy by estimating an exposure by an electronic flash and prohibiting an unnecessary light-emission of the electronic flash according to the estimated value and prevent an excessive overexposure when the subject distance is short.

The above subject can be accomplished by providing an electronic flash light-emission control method of adjusting a total exposure at a shooting by controlling a light-emission of an electronic flash with a programmed shutter in which an aperture of a lens and a shutter speed are determined on the basis of an exposure value determined from a subject brightness and a film speed, comprising the steps of: finding a control value for obtaining a target exposure according to at least a subject distance, a guide number of said electronic flash and the film speed; estimating an exposure by the electronic flash when said electronic flash emits a light according to the control value while an operation of said programmed shutter that is determined according to the exposure value determined from the subject brightness obtained by a photometry and the film speed is taken into consideration; and prohibiting the light-emission of the electronic flash when the estimated value of the exposure by the electronic flash is out of a predetermined permissible range with respect to the target exposure.

According to the present invention, the exposure by the electronic flash is estimated while an opening restriction of the shutter or a diaphragm by the programmed shutter is taken into consideration, and an unnecessary light-emission of the electronic flash is prohibited according to the estimated value. Therefore, energy can be saved and an excessive overexposure can be prevented.

A control target value of the exposure by the electronic flash according to the subject distance and the subject brightness may be previously prepared, and the control value may be determined according to the control target value. In this case, light-emission prohibition conditions for prohibiting the light-emission of the electronic flash may be found, and data of the control target value of the exposure by the electronic flash may be corrected with the light-emission prohibition conditions.

The above subject can be accomplished by providing an electronic flash light-emission control method of adjusting a total exposure at a shooting by controlling a light-emission timing of an electronic flash in association with an opening and closing control of a shutter that also works as a diaphragm and adjusts an aperture and a shutter speed by controlling an opening shape formed by said shutter, comprising: a first step of finding a first opening value for obtaining a target exposure according to at least a subject distance, a guide number of said electronic flash and the film speed; a second step of finding a range of a second opening value that can be controlled as a timing of the light-emission of the electronic flash according to an exposure value determined from the subject brightness obtained by a photometry and the film speed; and a third step of prohibiting the light-emission of the electronic flash when the subject brightness exceeds a predetermined reference value and the first opening value is more than a predetermined value, lower than a minimum value of the range of the second opening value.

The first opening value may be found according to a predetermined control target value of the exposure of the electronic flash as well as the subject distance, the guide number and the film speed, in the first step.

The electronic flash light-emission control method may comprise a step of prohibiting the light-emission of the electronic flash when the subject brightness exceeds a predetermined reference value and the first opening value is more than a predetermined value, higher than a maximum value of the range of the second opening value, instead of the third step or in addition to the third step. The predetermined value is preferably found according to a latitude of a photo film.

The above subject can be accomplished by providing an electronic flash light-emission control apparatus that has a shutter that also works as a diaphragm and adjusts an aperture and a shutter speed by controlling an opening shape formed by said shutter, an electronic flash part that emits a light in association with an opening and closing control of said shutter and a controlling device that adjusts a total exposure at a shooting by controlling a light-emission timing of said electronic flash part, comprising: a device that finds a first opening value for obtaining a target exposure according to at least a subject distance, a guide number of an electronic flash and the film speed; and a device that finds a range of a second opening value that can be controlled as a timing of the light-emission of the electronic flash according to an exposure value determined from the subject brightness obtained by a photometry and the film speed; wherein said controlling device prohibits the light-emission of the electronic flash when the subject brightness exceeds a predetermined reference value and the first opening value is more than a predetermined value, lower than a minimum value of the range of the second opening value.

Target value data of a control target value of the exposure by the electronic flash may be previously prepared, and the first opening value may be found according to the subject distance, the guide number of the electronic flash, the film speed and the control target value.

A controlling device, that prohibits the light-emission of the electronic flash when the subject brightness exceeds a predetermined reference value and the first opening value is more than a predetermined value, higher than a maximum value of the range of the second opening value, may be provided instead of said controlling device or in addition to said controlling device.

An inputting device that inputs information on a latitude of a photo film and an automatic setting device that automatically changes said predetermined value according to said latitude may be added.

The electronic flash light-emission control apparatus is applied to a camera comprising a photometry device that determines the subject brightness and said electronic flash that emits a light in association with the opening and closing control of said shutter. The present invention is suitable for a camera whose electronic flash is used to perform a shooting with a high exposure within the latitude even if a required exposure can be obtained without the light of said electronic flash.

BRIEF DESCRIPTION OF THE DRAWINGS

The nature of this invention, as well as other subjects and advantages thereof, will be explained in the following with reference to the accompanying drawings, in which like reference characters designate the same or similar parts throughout the figures and wherein:

FIG. 5 is an explanation drawing showing a correction table;

FIG. 8 is a program line diagram showing the relation between a Tv and the Av in a shutter program.

DETAILED DESCRIPTION OF THE PREFERRED EMBODIMENT

This invention will be described in further detail by way of example with reference to the accompanying drawings.

Figure 1:
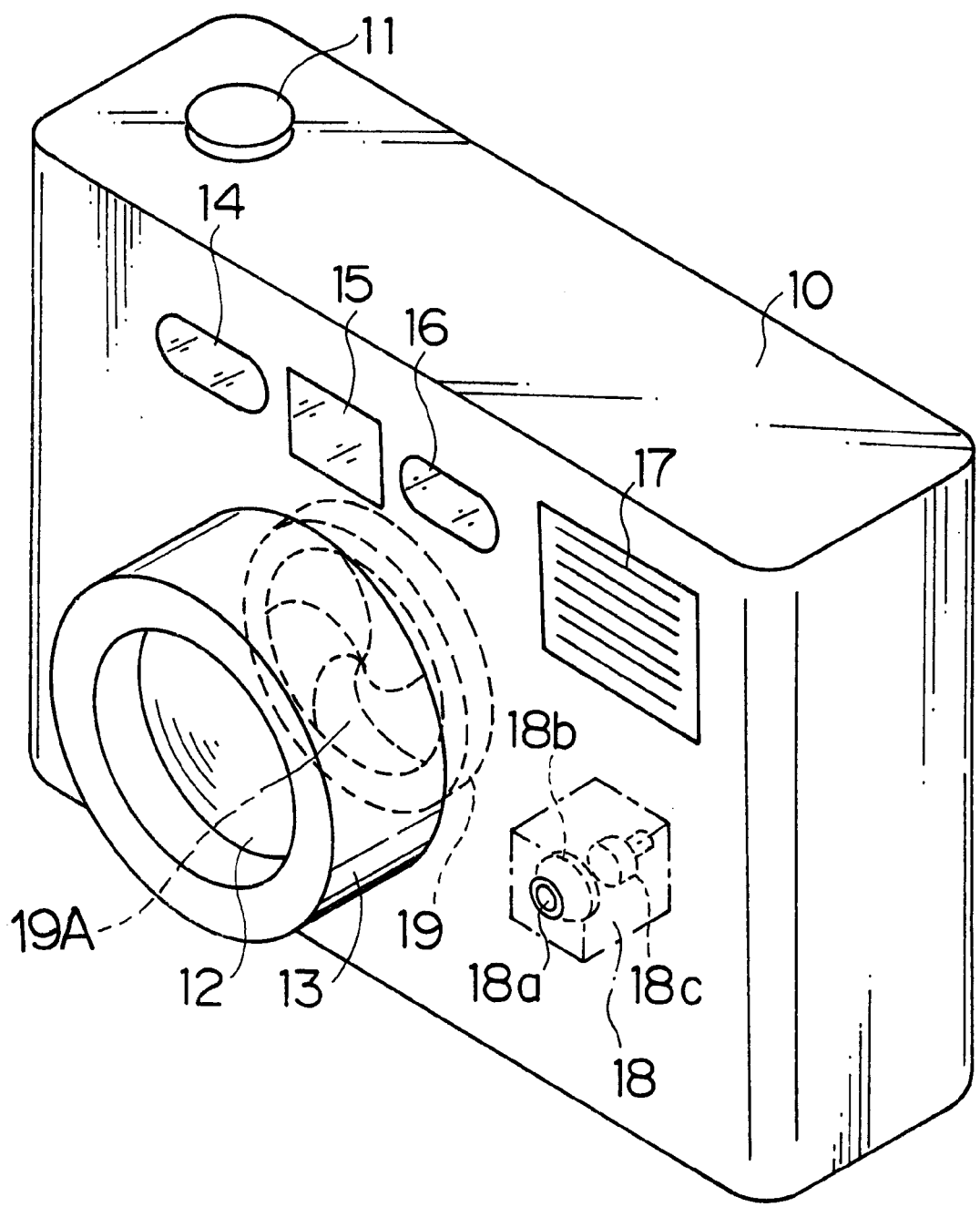
FIG. 1 is a perspective view showing a camera with a built-in electronic flash of an embodiment according to the present invention.

FIG. 1 is a perspective view showing a camera with a built-in electronic flash of an embodiment according to the present invention. The camera 10 is a 24 mm Advanced Photo System (APS) camera. As shown in FIG. 1, a shutter release button 11 is arranged on the top of a camera body that is substantially a rectangular parallelepiped, and a lens barrel 13 in which a lens 12 is incorporated is arranged in the center of the front of the camera body.

An AF light projector 14, a finder 15, an AF light receiver 16 and an electronic flash 17 are arranged in the upper part of the front of the camera body in that order from the left in FIG. 1, and a photometry part 18 for measuring the brightness of the external light is provided at the right side of the lens barrel 13. The AF light projector 14 and the AF light receiver 16 compose a focusing part for measuring the subject distance on the basis of, for example, the principle of triangulation. The photometry part 18 comprises an incident window 18a which is formed on the surface of the camera body, a lens 18b which is arranged on the inside of the incident window 18a and an electric eye photocell 18c which is arranged in the proximity of an image-forming position of the lens 18b. A light receiving surface of the electric eye photocell 18c is arranged a predetermined distance away from the image-forming position of the lens 18b. Thus, a perfect subject image is not formed on the light receiving surface of the electric eye photocell 18c and an average quantity of the external light in the whole visual field including the subject is measured by the electric eye photocell 18c.

A shutter 19 for giving a photo film a required exposure is provided on the optical axis of the lens 12 within the camera body. The shutter 19 also works as aperture blades, and it is a programmed shutter that adjusts the exposure by determining the aperture and the shutter speed from an opening shape of the shutter 19A. The electronic flash 17 is automatically used according to the opening timing of the shutter 19 to give the subject an auxiliary light. In the camera of the embodiment, the light-emission timing of the electronic flash 17 is a little different from the opening timing of the shutter 19, so that the exposure of the electronic flash 17 can be adjusted.

The method of adjusting the exposure of the electronic flash 17 will now be explained with reference to the time charts of FIGS. 2(a)–2(e). The time charts of FIGS. 2(a)–2(e) show timings of light-emissions of the electronic flash 17 after the shutter 19 starts working and how much exposures can be obtained. If the shutter 19 starts working and the electronic flash 17 is used after a time t1 (FIGS. 2(a) and 2(b)), the opening area of the shutter 19 is still small and a beam of light which exposes the film is small when the electronic flash 17 is used. Thus, the exposure is small (FIG. 2(c)).

On the other hand, if the shutter 19 starts working and the electronic flash 17 is used after a time t2 (FIG. 2(d)), the opening area of the shutter 19 is the largest and a beam of light which exposes the film is large. As a result, the exposure is almost twice as much as the exposure in the case that the electronic flash 17 is used the time t1 after the shutter 19 starts working (FIG. 2(e)). Thus, the exposure by the electronic flash 17 can be freely adjusted without changing the value of the emitted light of the electronic flash 17 by adjusting the light-emission timing of the electronic flash 17.

In this embodiment, the light-emission and the light-emission timing of the electronic flash 17 for obtaining the optimum exposure for the photographing are controlled according to the subject distance measured by the AF light projector 14 and the AF light receiver 16, the external light brightness in the visual field measured by the photometry part 18 and the latitude of the photo film in use.

Figure 3:
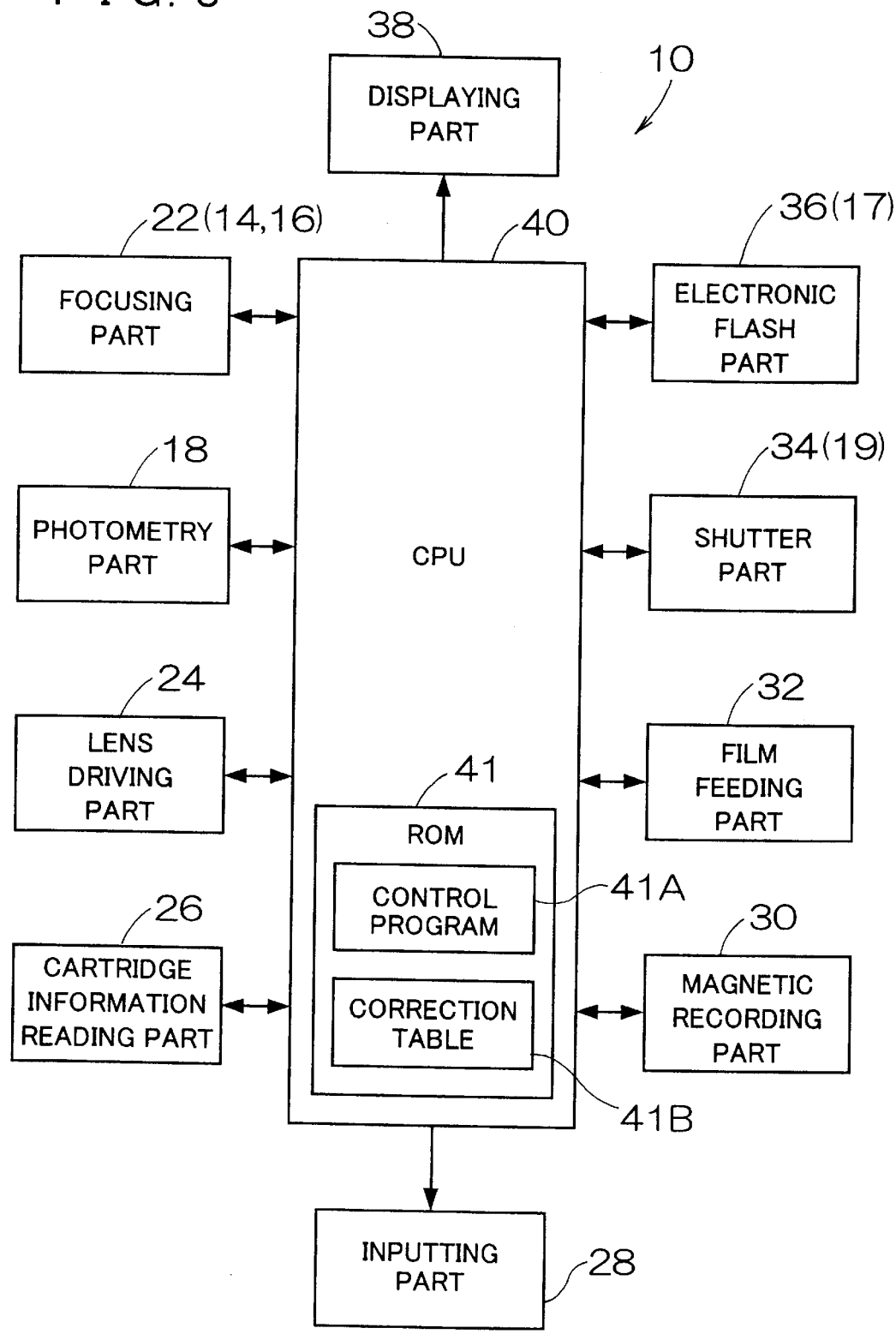
FIG. 3 is a block diagram showing the structure of the camera in FIG. 1.

FIG. 3 is a block diagram showing the structure of the camera 10. As shown in FIG. 3, the camera 10 comprises a focusing part 22, the photometry part 18, a lens driving part 24, a cartridge information reading part 26, an inputting part 28, a magnetic recording part 30, a film feeding part 32, a shutter part 34, an electronic flash part 36, a displaying part 38 and a central processing unit (CPU) 40 that controls these parts.

The focusing part 22 is equivalent to the AF light projector 14 and the AF light receiver 16 explained in FIG. 1. The lens driving part 24 includes an electric motor for zooming and focusing the taking lens 12.

The cartridge information reading part 26 includes a device for reading a data disc of a cartridge. The data disc is a disc on which a barcode is printed, and information such as the ISO speed, the number of frames of the film and the type of the film is read when the data disc is rotated forward or backward.

The inputting part 28 includes a mode switching dial, a zoom switch, a electronic flash mode setting switch and operation keys (not shown), and the inputting part 28 is an interface part for the user to operate the camera 10 and input various commands.

The magnetic recording part 30 has a magnetic head, and the magnetic recording part 30 writes and reads magnetic information in and from a magnetic layer formed on the photo film.

The film feeding part 32 has a feeding motor, and the film feeding part 32 automatically winds and rewinds the film. The shutter part 34 includes a driving device for the shutter 19 explained in FIG. 1. The electronic flash part 36 is equivalent to the electronic flash 17 explained in FIG. 1. The displaying part 38 is, for example, a liquid crystal panel, and a variety of information on the state of the camera 10 such as the residual value of a battery, a self-timer, date display, a film counter and shooting mode display is displayed on the displaying part 38.

The CPU 40 is a processing part that controls the whole camera 10, and it controls the light-emission timing of the electronic flash part 36 on the basis of a control program 41A stored in a ROM 41. A data table (correction table) 41B of correction values that are used for calculating the exposure by the electronic flash 17, and the CPU 40 adjusts the exposure by the electronic flash 17 that will be described later by the use of the correction table 41B.

The CPU 40 controls the shooting operation in response to a signal inputted from the shutter release button 11, and controls the parts according to various signals inputted from the inputting part.

The CPU 40 receives a half-push signal or a full-push signal from the shutter release button 11 according to the pushing operation. When the CPU 40 receives the half-push signal from the shutter release button 11, the CPU 40 transmits a signal for measuring the subject distance to the AF light projector 14 and transmits a signal for measuring the external light brightness within the visual field to the photometry part 18. The AF light projector 14 (and the AF light receiver 16) and the photometry part 18 perform the focusing and the photometry, respectively, on the basis of the signals. Further, when the CPU 40 receives the full-push signal from the shutter release button 11, the CPU 40 transmits a signal for light-emission to the electronic flash 17 and transmits a signal for opening and closing the shutter 19 to the shutter 19.

An explanation will be given of the procedure in which the CPU 40 controls the light-emission timing on the basis of the control program 41A with reference to the flow chart of FIG. 4.

First, when the power switch is turned on and the processing begins, the initial processing such as clearing the memory built in the CPU 40 and setting an I/O port is performed (S410). Then, it is determined whether any switches of the inputting part 28 have been operated (S412), and the processing is suspended until any one of the switches is operated. The switches are a self-timer switch, a zoom switch (not shown) and the like as well as the shutter release button 11. If any switches have been operated, it is determined whether or not the switch is the shutter release button 11 (S414). If a switch other than the shutter release button 11 has been operated, the processing for the switch is performed (S416), and the process returns to S412.

If it is detected that the shutter release button 11 has been pushed at S414, the residual capacity of the power source battery is determined and it is determined whether or not the power source battery is good (S418). If the power source battery is not good, the process returns to S412.

If the power source battery is good at S418, then the signal from the CPU 40 is transmitted to the photometry part 18, which measures the external light brightness in the visual field (S420). Furthermore, the signal from the CPU 40 is transmitted to the AF light projector 14, and the AF light projector 14 and the AF light receiver 16 measure the subject distance (S422). Then, an exposure value Ev which is a control value for the shutter 19 is calculated from the apex value (Bv) of the external light brightness found at S420 and the apex value (Sv) of the film speed by the following equation 1 (S424), $$Ev = Sv + Bv \qquad \text{equation 1.}$$

The shutter speed and the aperture for obtaining the exposure required for photographing are determined from the calculated Ev.

Then, an Av for determining the light-emission timing of the electronic flash 17 is calculated (S426). The Av is a value corresponding to the opening area of the shutter 19 when the electronic flash 17 is used. The electronic flash 17 should be used when the opening area that gradually increases after the shutter 19 starts working reaches the Av, and thus the light-emission timing of the electronic flash 17 can be determined from the Av.

The Av corresponds to an opening value (first opening value) for acquiring the desired exposure, and it is calculated from the subject distance (D), a guide number (GNo.) of the electronic flash, the film speed and a target value of the exposure by the electronic flash.

The following equation 2 is a conditional equation for an appropriate exposure when a shooting is performed and the subject is illuminated with the electronic flash light and the film speed is NS and the F-number is F, $$AV = (Gv - 5) + SV - DV - \Delta_{DP} \qquad \text{equation 2:}$$

wherein the Av satisfies the equation 3, $$F^2 = 2^{Av} \qquad \text{equation 3;}$$

and the Gv satisfies the equation 4 in which $G_{100}$ is the guide number (GNo.) when the film speed is ISO 100, $$G_{100}^2 = 2^{GV} \qquad \text{equation 4;}$$

and the Sv satisfies the equation 5 in which $S_{100}$ that is the Sv when the film speed is ISO 100 is 5, $$NS = 2^{Sv} \qquad \text{equation 5;}$$

and the Dv satisfies the equation 6, $$D^2 = 2^{Dv} \qquad \text{equation 6;}$$

and the $\Delta_{DP}$ is defined by the equation 7 in which an exposure coefficient of the electronic control with the control program for the exposure by the electronic flash is $\alpha$, $$\Delta_{DP} = \log_2 \alpha \qquad \text{equation 7.}$$

The exposure coefficient $\alpha$ corresponds to a correction value (offset value) for adjusting the exposure by the electronic flash, and it is a value that indicates the ratio of the exposure by the electronic flash to a reference exposure according to the target value.

Figure 2:
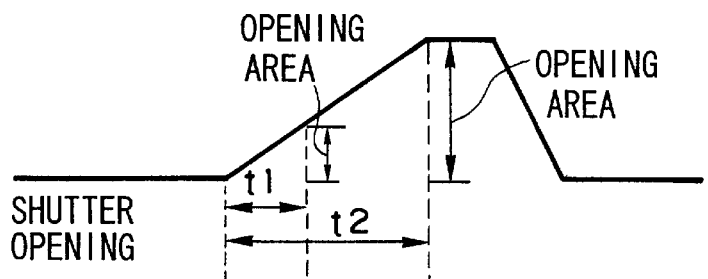
FIGS. 2(a)–2(e) are timing charts showing relationships between opening timings of a shutter and light-emission timings of the electronic flash.

The exposure coefficient $\alpha$ is found on the correction table 41B stored in the ROM 41 explained in FIG. 2. Multiple types of the correction tables 41B are stored for different speeds of photo films and zoom positions of the lens, and an appropriate correction table 41B is selected according to shooting conditions.

FIG. 5 shows the correction table 41B. As shown in FIG. 5, the parameters of the correction table 41B are the Ev and the subject distance (D), and the correction table 41B is a table for finding the offset value (OFS) that corresponds to the exposure coefficient $\alpha$. In FIG. 5, the exposure value Ev is classified into four levels (lower than EV1, between EV1 and EV2, between EV2 and EV3 and higher than EV3) and the subject distance is classified into four levels (shorter than D1, between D1 and D2, between D2 and D3 and longer than D3). The exposure value EV2 exceeds the EV1, and the EV3 exceeds the EV2; and the distance D2 is longer than the D1, and the D3 is longer than the D2.

The target value for the exposure by the electronic flash 17 is determined with respect to each combination of the levels (see FIG. 5). Basically, when the Ev is lower than the EV1, the OFSs are 1, that is, the exposure by the electronic flash 17 is the maximum exposure (100%) since the external light is not sufficient for the required exposure. When the Ev exceeds the EV1, the OFSs are within the range between ½ and ⅛, that is, the exposure by the electronic flash 17 is lower than the maximum exposure. In this case, the shorter the subject distance is, the lower the OFS is.

In FIG. 5, the OFS is ½ when the distance is between the D1 and the D2 and the Ev is between the EV2 and the EV3. The OFS is 1 when the distance is longer than the D3 and the Ev is between the EV1 and the EV2. The OFS (the exposure coefficient $\alpha$) is found, and the $\Delta_{DP}$ is calculated from the exposure coefficient a by the equation 7.

Figure 4:
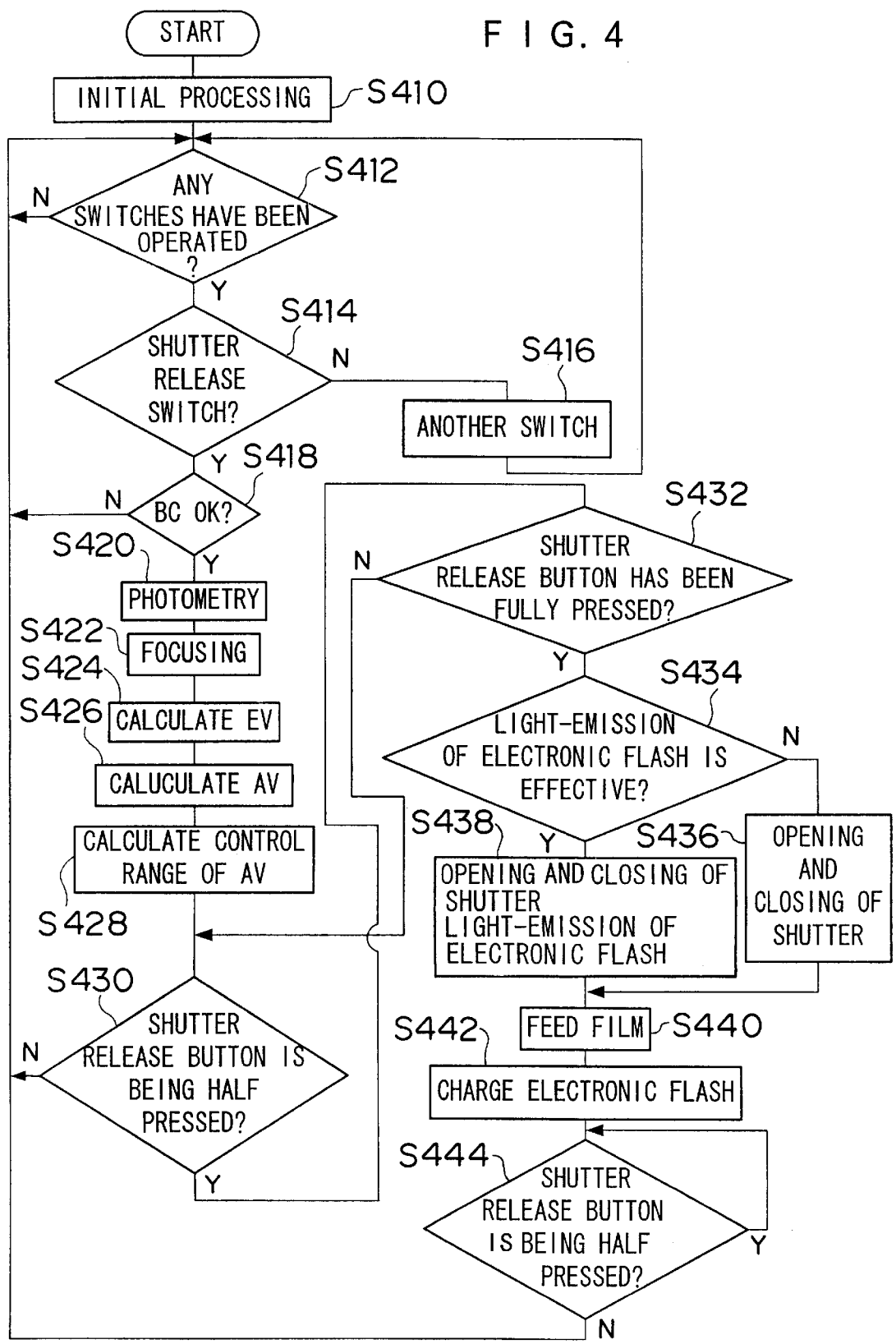
FIG. 4 is a flow chart showing a procedure of a timing control of the light-emission of the electronic flash.

The Av is calculated from the Gv, the Sv, the Dv and the $\Delta_{DP}$ calculated by the equations 4, 5, 6 and 7, respectively, by the equation 2 (S426 in FIG. 4).

Figure 6:
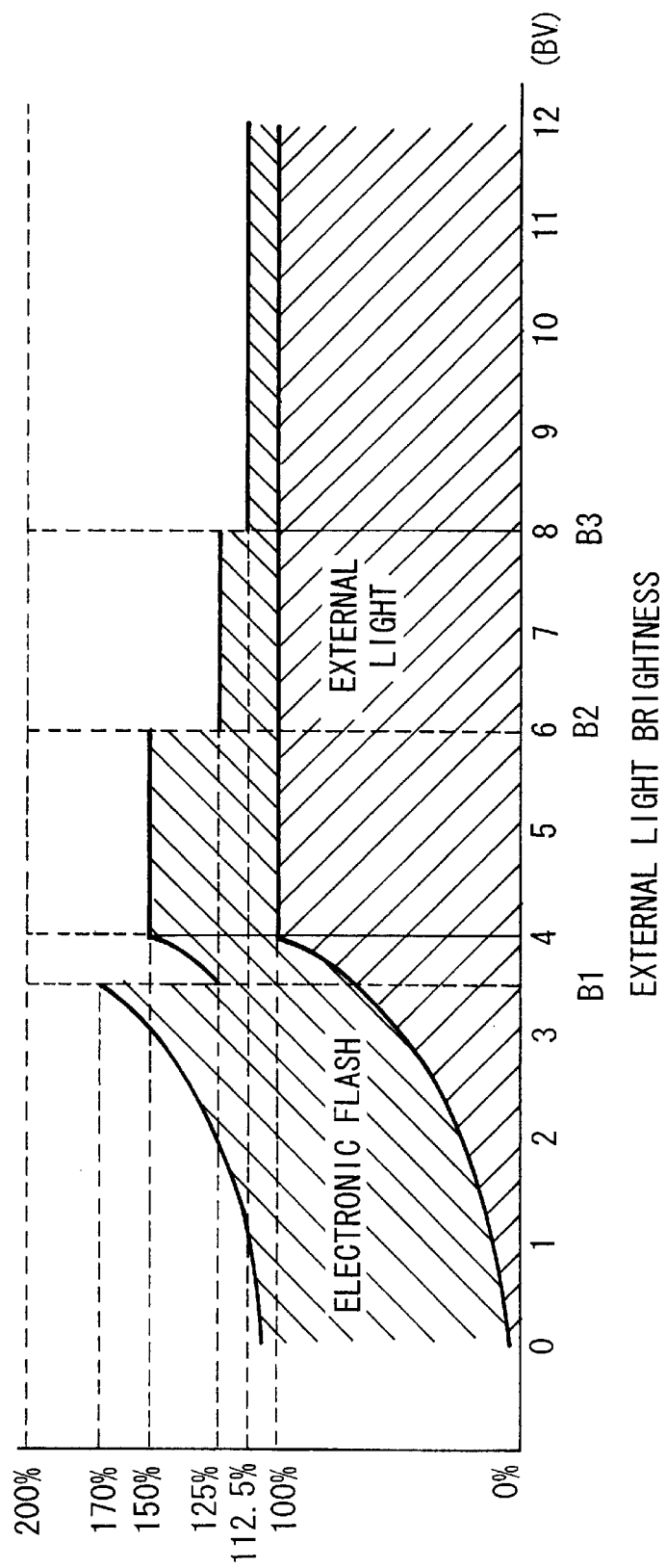
FIG. 6 is a graph diagram showing a control of an exposure by the electronic flash according to the correction table in FIG. 5.

The relationship between the exposure by the electronic flash 17 controlled according to the correction table 41B when the film speed is ISO 100 in FIG. 5 and the exposure by the external light will hereunder be explained with reference to the graph in FIG. 6. In FIG. 6, the abscissa is the external light brightness and the ordinate is the exposure. The exposure of 100% is the reference exposure that is appropriate for the AE control, and the exposure by the electronic flash 17 is added to the exposure by the external light. In FIG. 6, the film speed is ISO 100 and the subject distance is shorter than the D1. B1, B2 and B3 in FIG. 6 are brightnesses that correspond to the EV1, EV2 and EV3 in FIG. 5, respectively.

As shown in FIG. 6, when the external light brightness (BV) is lower than 4, the shutter 19 is open only for a predetermined time to prevent a camera shake, and thus the external light is not sufficient for the reference exposure (100%) required for photographing. Therefore, the limit of the brightness (BV) for the so-called AE control is around 4.

When the external light brightness (BV) is lower than 4; the higher the external light brightness is, the higher the exposure by the external light is. When the external light brightness (3V) exceeds 4, the AE control effectively functions to control the shutter 19 so that the exposure of the external light is kept at the reference exposure (100%). Thus, the exposure by the external light is constant when the external light brightness (BV) exceeds 4.

On the other hand, the exposure by the electronic flash 17 is the exposure required for photographing (100%) when the external light brightness is lower than the B1. The OFSs are 1, ½, ¼ and ⅛ when the external light brightness is lower than the B1, between the B1 and the B2, between the B2 and the B3 and higher than the B3, respectively, in the correction table 41B (see FIG. 5).

The total exposure of the film is the sum of the exposure by the external light and the exposure by the electronic flash 17. When the brightness (BV) is lower than 4; the higher the brightness is, the higher the exposure by the external light. At the brightness (the B1) which is lower than 4, the exposure by the electronic flash 17 is switched. The brightnesses (B1, B2 and B3) at which the exposures by the electronic flash 17 are switched are called "SWITCH BRIGHTNESSES". In FIG. 6, when the brightness is lower than the switch brightness B1, the exposure by the electronic flash 17 is the maximum value (100%); and when the brightness is between the switch brightnesses B1 and B2, the exposure by the electronic flash 17 is 50% of the maximum value; and when the brightness is between the switch brightnesses B2 and B3, the exposure by the electronic flash 17 is 25% of the maximum value, and when the brightness exceeds the switch brightness B3, the exposure by the electronic flash 17 is 12.5% of the maximum value. In this way, the total exposure is prevented from being excessively larger than the appropriate exposure. The exposures by the electronic flash 17 and the switch brightness are determined in such a manner that the total exposure can always be appropriate.

In case of the negative color film whose latitude is relatively large, the camera can perform a fine shooting by adding the exposure by the electronic flash 17 to the exposure by the external light. Especially, in the embodiment, the exposure by the electronic flash 17 is prevented from being excessively large when the external light brightness (BV) is around 4 which is the limit value for the AE control. Therefore, the balance in quantity of light between the subject and the background can be kept, and the subject can be prevented from being whitened and standing out from the background.

If the external light brightness (BV) exceeds 4, the exposure by the electronic flash 17 gradually decreases as the external light brightness becomes higher. When the brightness is between the B1 and the B2, the exposure is 50% of the maximum value; and when the brightness is between the B2 and the B3, the exposure is 25% of the maximum value; and when the brightness exceeds the B3, the exposure is 12.5% of the maximum value.

When the electronic flash 17 is used in such a manner that the exposure by the electronic flash 17 is fixed even if the external light brightness is high, the ratio of the background to the subject in quantity of light is lowered. As a result, the background on the print is dark even though the external light is enough. In the camera 10, the exposure by the electronic flash 17 gradually decreases as the external light brightness becomes higher, and thus the ratio of the background to the subject in quantity of light is not lowered even if the external light brightness is high. Therefore, the background on the print is not dark even when the brightness is high, and a special ambience of the photograph is not ruined. As shown on the correction table in FIG. 5, the exposure of the electronic flash 17 gradually decreases as the external light brightness becomes higher even if the subject distance is longer than the D1, and therefore the same effect can be achieved even if the subject distance is long. The electronic flash that is controlled so that the exposure by the electronic flash is gradually adjusted is called a digital program (DP) electronic flash.

The relationships between the exposures by the electronic flash 17 and the exposures by the external light when the subject distances are between the D1 and the D2, between the D2 and the D3 and longer than the D3 are not shown, and the exposures by the electronic flash 17 are controlled according to the correction table in FIG. 5 in those cases.

After the Av is calculated at S426 in FIG. 4, a control range of the Av is calculated (S428).

This is a step for determining a range of an opening value (second opening value) for the light-emission-control of the electronic flash 17 from the exposure value (Ev) calculated from the external light brightness measured at S420 and the film speed NS.

The control range of the Av is represented by the equation 8, $$Av_{(MIN)} \leq Av \leq Av_{(MAX)} \qquad \text{equation 8.}$$

In the equation 8, the minimum opening value $Av_{(MIN)}$ (a value corresponding to the maximum opening of the shutter) of the flashmatic (FM) control is controlled on the basis of the program of the shutter 19, and the minimum opening value $Av_{(MIN)}$ is indicated by the equation 9, $$Av_{(MIN)} = p(Ev) \qquad \text{equation 9.}$$

Figure 7:
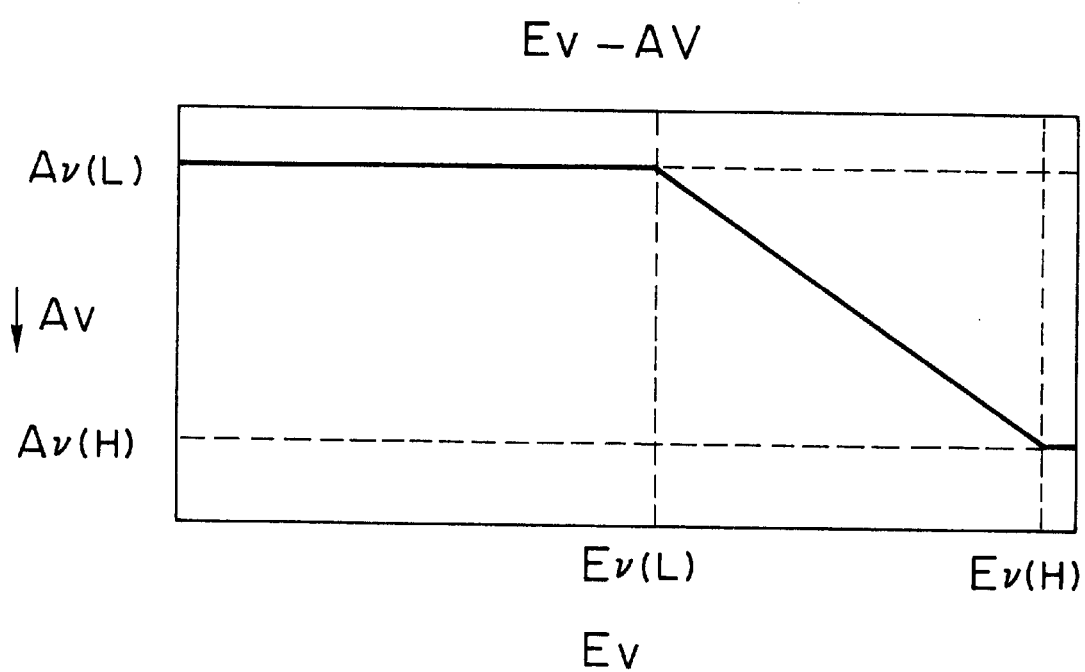
FIG. 7 is a graph diagram showing a relation between an Ev and an Av.

As shown in FIG. 7, the p(Ev) is a function that represents the relation between the Av and the Ev, and it is roughly shown by lines and indicated by the equation 10, $$p(Ev) = \begin{cases} Av_{(L)} & Ev < Ev_{(L)} \\ (Av_{(H)} - Av_{(L)}) \times (Ev - Ev_{(L)}) / (Ev_{(H)} - Ev_{(L)}) + Av_{(L)} & Ev_{(L)} \leq Ev < Ev_{(H)} \\ Av_{(H)} & Ev_{(H)} \leq Ev \end{cases} \qquad \text{equation 10}$$

The maximum opening value $Av_{(MAX)}$ (a value corresponding to the minimum opening of the shutter) of the FM control is restricted according to stability of operation of the shutter 19 by its mechanical structure.

FIG. 8 is a program line diagram showing the relation between a Tv and the Av. The Tv plus the Av is the Ev, and thus the Av and the Tv are found on the program line diagram in FIG. 8 from the Ev. The control range of the Av is determined in this way. The electronic flash 17 is controlled with respect to the target value of the exposure by the electronic flash 17 according to the correction table while the control range of the Av is taken into consideration.

Under conditions where enough exposure can be obtained only by the external light without the light of the electronic flash 17 (the case where the AE shooting is possible), the electronic flash 17 is controlled so as to be prohibited from emitting a light under a fixed condition. Control methods of the light-emission of the electronic flash 17 will be explained.

① In the first method, the electronic flash 17 is prohibited from emitting a light if the Av calculated at S426 in FIG. 4 is more than a predetermined value ΔAv, smaller than the minimum value ($Av_{(MIN)}$) of the Av control range calculated at S428, that is, if the equation 11 is satisfied, $$Av \leq Av_{(MIN)} - \Delta Av \qquad \text{equation 11.}$$

Figure 9:
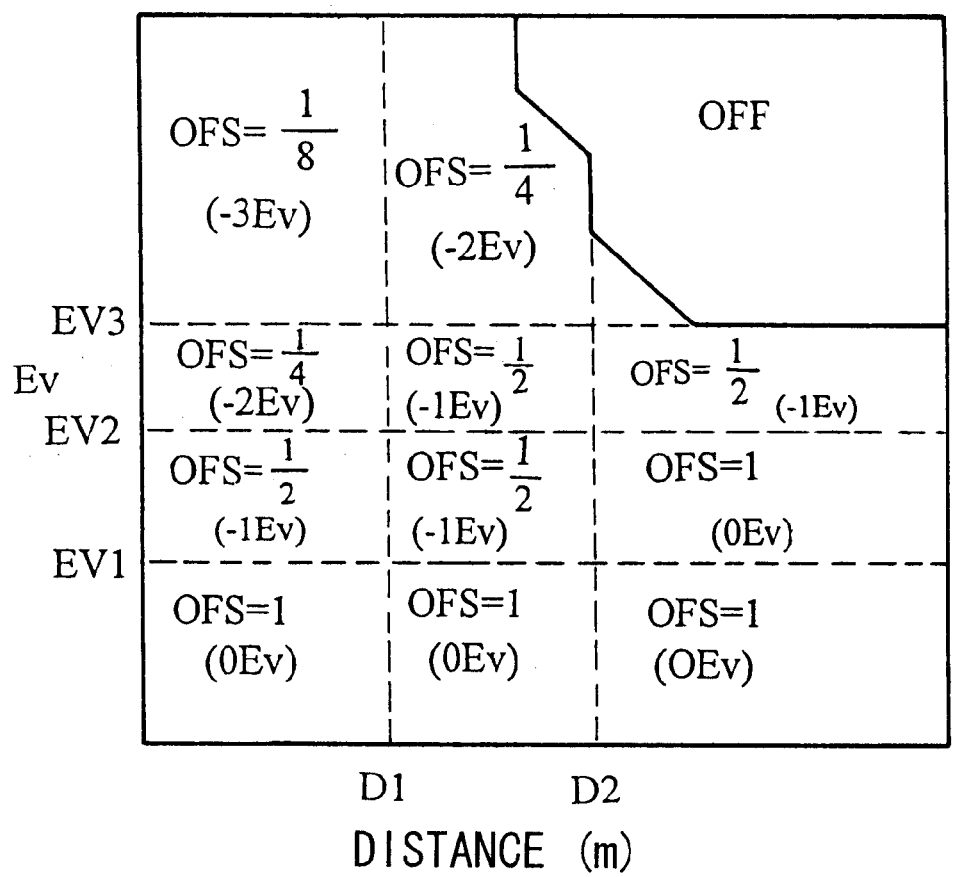
FIG. 9 is a graph diagram showing a control of an exposure by the electronic flash while a control range of the Av is taken into consideration.

The exposure control of the electronic flash 17 shown in FIG. 9 is performed by the control with respect to the target value shown in FIG. 5. The electronic flash 17 is prohibited from emitting a light if the estimated value of the exposure by the electronic flash 17 is lower than a fixed reference value, and thus the electronic flash 17 is prevented from emitting a light in vain to save energy. This method is effective when the subject distance is long.

② In the second method, the electronic flash 17 is prohibited from emitting a light if the Av calculated at S426 in FIG. 4 is more than a predetermined value ΔAv, larger than the maximum value ($Av_{(MAX)}$) of the Av control range calculated at S428, that is, if the equation 12 is satisfied, $$Av_{(MAX)} + \Delta Av \leq Av \qquad \text{equation 12.}$$

The electronic flash 17 is prohibited from emitting a light when the opening area of the shutter 19 required for the electronic flash 17 can not be arrived at by the control of the shutter 19. This prevents the exposure by the electronic flash 17 from being excessive when the subject distance is short. The predetermined value ΔAv is automatically adjusted according to the latitude of the film in use.

Latitudes of films are different according to types and manufacturers (makers) of the films. For example, the latitude of a negative color film is from +3 to −1, and the latitude of a positive color film is from +½ to −½. Thus, the latitude of the film in use is realized according to the information read from the cartridge information reading part 26 or the magnetic information read from the magnetic recording part 30, and the suitable predetermined value ΔAv for the latitude of the film is set.

③ In the third method, the electronic flash 17 is prohibited from emitting a light if the Av calculated at S426 in FIG. 4 is more than a predetermined value ΔAv, smaller than the minimum value ($Av_{(MIN)}$ or more than a predetermined value ΔAv, larger than the maximum value ($Av_{(MAX)}$) of the Av control range calculated at S428. The third method is a combination of the first method and the second method. The electronic flash 17 is prohibited from emitting a light if the equation 13 or the equation 14 is satisfied, $$Av \leq Av_{(MIN)} - \Delta Av \quad \text{equation 13,}$$
$$Av_{(MAX)} + \Delta Av \leq Av \quad \text{equation 14.}$$

As described in the first, second and third methods, the estimated value of the actual exposure of the electronic flash 17 is calculated with respect to the target value explained in FIG. 5 to prohibit the electronic flash 17 from emitting the light in vain and prevent the excessive overexposure when the subject distance is short.

After the control range of the Av is calculated at S428 in FIG. 4, it is determined whether or not the shutter release button 11 is being half pressed (S430). If the shutter release button 11 is not being half pressed without being fully pressed, the process returns to S412.

Meanwhile, if the shutter release button 11 is still being half pressed, then it is determined whether or not the shutter release button 11 has been fully pressed (S432). If the shutter release button 11 is still being half pressed without being fully pressed, the process returns to S430. If the shutter release button 11 has been fully pressed at S432, then it is determined whether or not the light-emission of the electronic flash 17 is effective (whether to use the electronic flash 17) (S434).

If the light-emission of the electronic flash 17 is not effective, it is prohibited and a shooting is performed only by the opening and closing control of the shutter 19 (S436). The shutter 19 is opened and closed according to the Ev calculated at S108.

If the light-emission of the electronic flash 17 is effective at S434, a shooting is performed while the light-emission of the electronic flash 17 is controlled in association with the opening and closing control of the shutter 19 (S438). The electronic flash 17 emits the light when the opening area of the shutter 19 reaches the Av calculated at S426.

The film is fed (S440) after the shutter 19 is closed at S436 or S438, and the electronic flash 17 is charged (S442). Then, the processing is suspended while the shutter release button 11 is being half pushed (S444), and after the user releases the finger from the shutter release button 11, the processing returns to S412.

In the embodiment, the correction table in FIG. 5 is explained. But the correction table is not limited to this, and the external light brightness and the subject distance may be classified into more levels or less levels.

In the embodiment, the estimated value of the actual exposure of the electronic flash 17 is calculated from the target value, and the electronic flash 17 is prohibited from emitting the light when the estimated value is not within the control range. But, an electronic flash light-emission prohibition area may be previously determined according to the estimated value, and a correction table may be produced while the electronic flash light-emission prohibition area is taken into consideration. For example, in the above-described first method, a correction table in FIG. 9 may be used instead of the correction table in FIG. 5, and the Av may be calculated according to the correction table in FIG. 9 and whether to use the electronic flash 17 and the exposure may be controlled.

In the camera 10 in FIG. 1, the active autofocusing with the AF light projector 14 and the AF light receiver 16 is adopted, but the passive autofocusing may be adopted. The present invention is applied to the camera 10 with the built-in electronic flash 17, but it may be applied to an electronic flash outside a camera.

The present invention may be applied to various cameras in which a 35 mm film and other films as well as the APS camera. A cartridge of the 35 mm film is has a camera automatic determination code that is called a DX code. The camera automatic determination code has a conductive part and an insulating part, and the camera automatic determination code represents a film speed code, a frame number determination code, a latitude determination code and so on by a pattern of an electric contact range. A DX code camera has an electric contact part for reading the camera automatic determination code, and automatically reads the codes after the film is loaded. The latitude of the film may be realized with the camera automatic determination code.

Moreover, a luster code on an end (tongue) of the film may be read and a barcode on the side of a film cartridge may be read so that the latitude of the film is realized. The user may input the information on the latitude.

As set forth hereinabove, the control value for obtaining the target exposure is calculated from the subject distance, the guide number, the film speed and so on, and the exposure by the electronic flash is estimated while the opening restriction of the programmed shutter determined according to the exposure value found by the AE control is taken into consideration, and the electronic flash is prohibited from emitting the light in vain according to the estimated value. Thus, the energy is saved, and the excessive overexposure is prevented when the subject distance is short.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic flash light-emission control method of adjusting a total exposure at a shooting by controlling a light-emission timing of an electronic flash in association with an opening and closing control of a shutter that also works as a diaphragm and adjusts an aperture and a shutter speed by controlling an opening shape formed by said shutter, the method comprising the steps of:

a first step of finding a first opening value for obtaining a target exposure according to at least a subject distance, a guide number of said electronic flash and the film speed;

a second step of finding a range of a second opening value that can be controlled as a timing of the light-emission of the electronic flash according to an exposure value determined from the subject brightness obtained by a photometry and the film speed; and a third step of prohibiting the light-emission of the electronic flash when the subject brightness exceeds a predetermined reference value and the first opening value is more than a predetermined value, lower than a minimum value of the range of the second opening value, wherein the light-emission of the electronic flash is prohibited when the subject brightness exceeds a predetermined reference value and the first opening value is more than a predetermined value, higher than a maximum value of the range of the second opening value.

2. The electronic flash light-emission control method as defined in claim 1, wherein the first opening value is found according to a predetermined control target value of the exposure of the electronic flash in the first step.

3. The electronic flash light-emission control method as defined in claim 1, wherein the predetermined value is determined according to a latitude of a photo film.

4. An electronic flash light-emission control method of adjusting a total exposure at a shooting by controlling a light-emission timing of an electronic flash in association with an opening and closing control of a shutter that also works as a diaphragm and adjusts an aperture and a shutter speed by controlling an opening shape formed by said shutter, the method comprising:

a first step of finding a first opening value for obtaining a target exposure according to at least a subject distance, a guide number of said electronic flash and the film speed;

a second step of finding a range of a second opening value that can be controlled as a timing of the light-emission of the electronic flash according to an exposure value determined from the subject brightness obtained by a photometry and the film speed; and a third step of prohibiting the light-emission of the electronic flash when the subject brightness exceeds a predetermined reference value and the first opening value is more than a predetermined value, higher than a maximum value of the range of the second opening value.

5. An electronic flash light-emission control apparatus that has a shutter that also works as a diaphragm and adjusts an aperture and a shutter speed by controlling an opening shape formed by said shutter, an electronic flash part that emits a light in association with an opening and closing control of said shutter and a controlling device that adjusts a total exposure at a shooting by controlling the opening and closing of said shutter and a light-emission timing of said electronic flash part, the apparatus comprising:

a device that finds a first opening value for obtaining a target exposure according to at least a subject distance, a guide number of said electronic flash part and the film speed; and a device that finds a range of a second opening value that can be controlled as a timing of the light-emission of said electronic flash part according to an exposure value determined from the subject brightness obtained by a photometry and the film speed, wherein sad controlling device prohibits the light-emission of said electronic flash part when the subject brightness exceeds a predetermined reference value and the first opening is more than a predetermined value, lower than a minimum value of the range of the second opening value, wherein said controlling device prohibits the light-emission of said electronic flash part when the subject brightness exceeds a predetermined reference value and the first opening value is more than a predetermined value, higher than a maximum value of the range of the second opening value.

6. The electronic flash light-emission control apparatus as defined in claim 5, wherein target value data of a control target value of the exposure by said electronic flash part is previously prepared and the first opening value is found according to the subject distance, the guide number of said electronic flash part, the film speed and the control target value.

7. The electronic flash light-emission control apparatus as defined in claim 5, further comprising:

an inputting device that inputs information on a latitude of a photo film; and an automatic setting device that automatically changes said predetermined value according to said latitude.

8. A camera provided with the electronic flash light-emission control apparatus as defined in claim 5, said camera comprising:

a photometry device that determines the subject brightness; and said electronic flash part that emits a light in association with the opening and closing control of said shutter.

9. The camera as defined in claim 8, wherein said electronic flash part is used to perform a shooting with a high exposure within the latitude even if a required exposure can be obtained without the light of said electronic flash part.

10. An electronic flash light-emission control apparatus that has a shutter that also works as a diaphragm and adjusts an aperture and a shutter speed by controlling an opening shape formed by said shutter, an electronic flash part that emits a light in association with an opening and closing control of said shutter and a controlling device that adjusts a total exposure at a shooting by controlling the opening and closing of said shutter and a light-emission timing of said electronic flash part, the apparatus comprising:

a device that finds a first opening value for obtaining a target exposure according to at least a subject distance, a guide number of said electronic flash part and the film speed; and a device that finds a range of a second opening value that can be controlled as a timing of the light-emission of said electronic flash part according to an exposure value determined from the subject brightness obtained by a photometry and the film speed, wherein said controlling device prohibits the light-emission of said electronic flash part when the subject brightness exceeds a predetermined reference value and the first opening value is more than a predetermined value, higher than a maximum value of the range of the second opening value.

* * * * *